Nov. 2, 1943. W. T. GRAHAM 2,333,371
ADJUSTABLE WEED CUTTING ATTACHMENT
Filed May 2, 1941 2 Sheets-Sheet 1
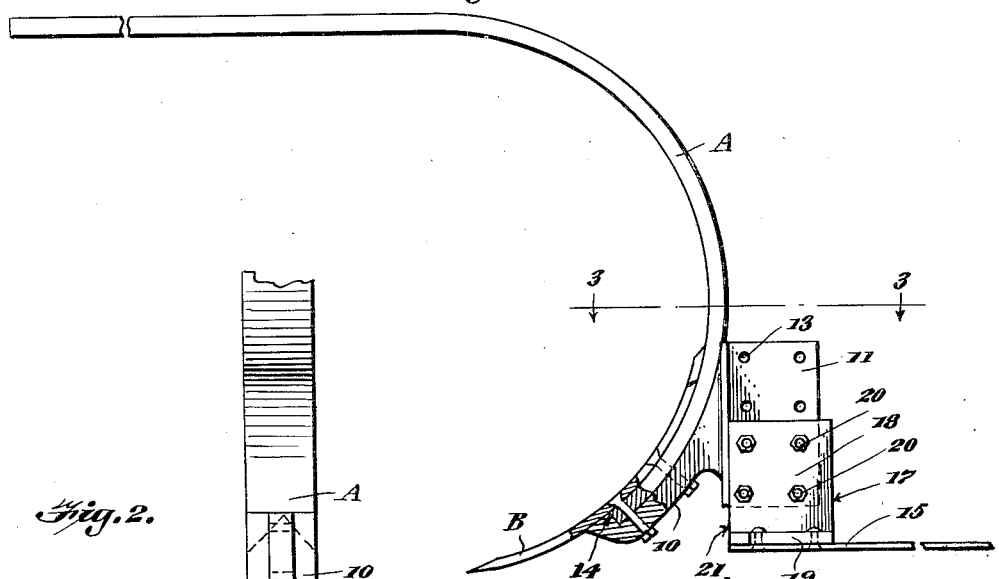
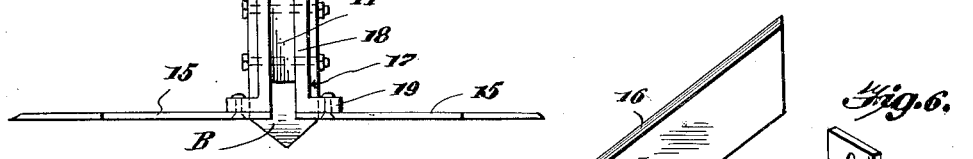
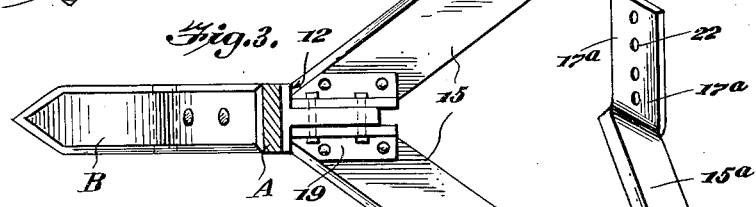
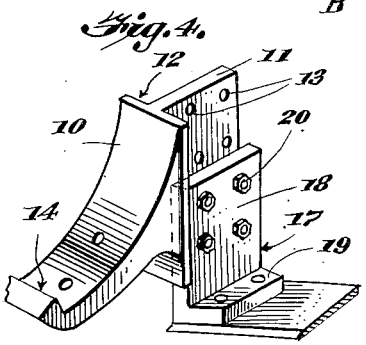
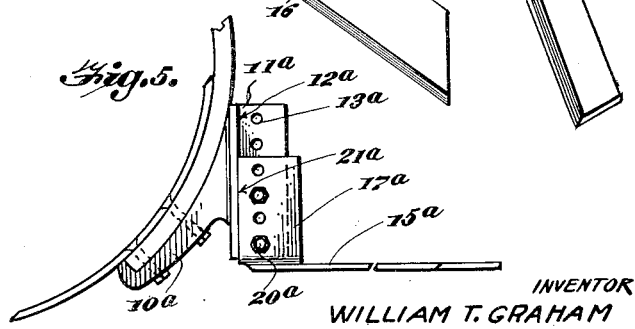
INVENTOR
WILLIAM T. GRAHAM

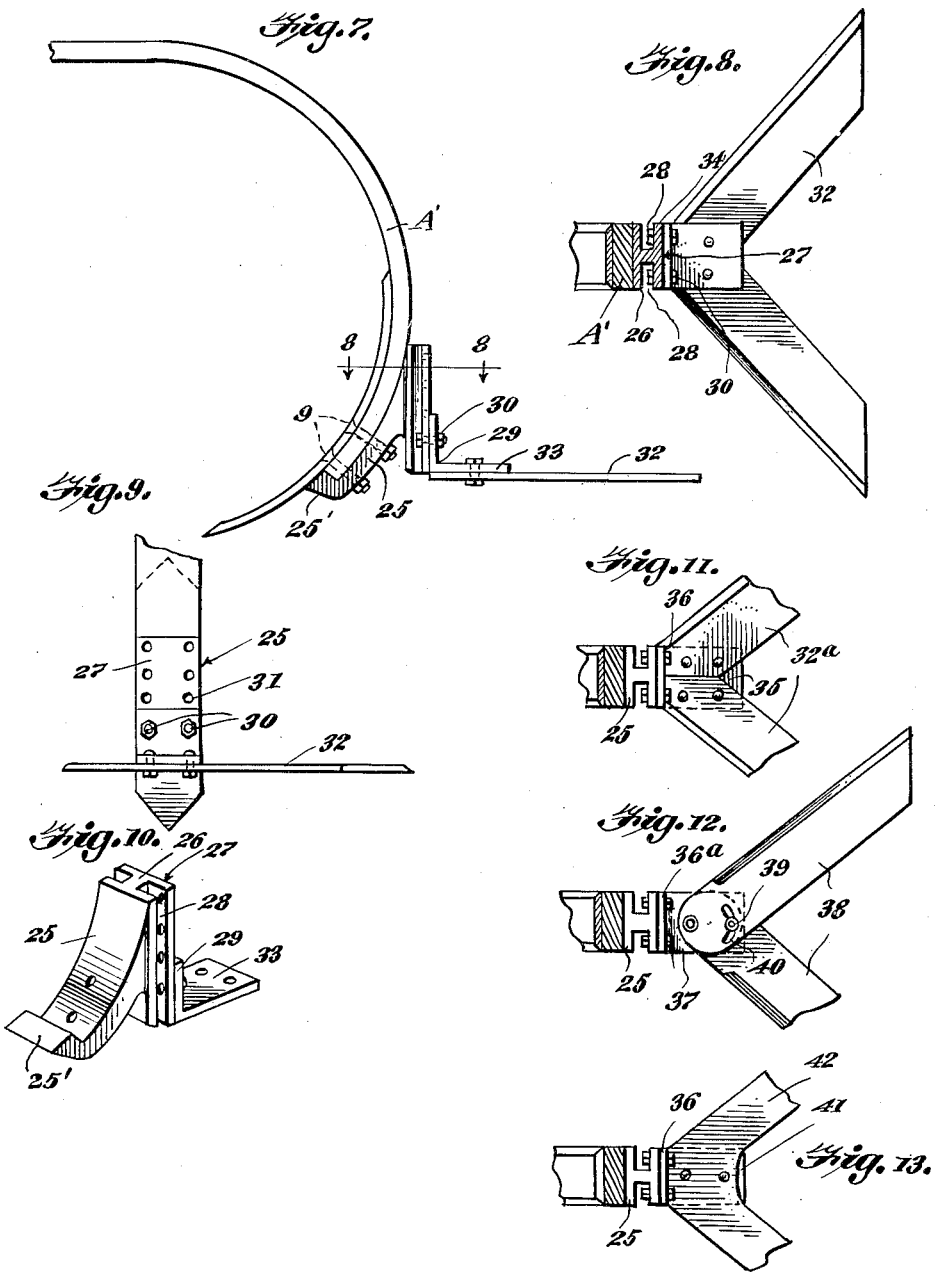

Patented Nov. 2, 1943

2,333,371

UNITED STATES PATENT OFFICE 2,333,371

ADJUSTABLE WEED CUTTING ATTACHMENT

William T. Graham, Amarillo, Tex.

Application May 2, 1941, Serial No. 391,606

3 Claims. (Cl. 97—207)

This invention relates to an adjustable weed cutting attachment, for resilient shank plows, cultivators and other similar agricultural implements, and has for one of its objects the production of a simple and efficient means for adjustably connecting weed cutting blades to a resilient supporting shank, in a manner whereby the blades will be properly braced to hold the blades in properly adjusted horizontal position relative to the plow or cultivating element.

A further object of this invention is the production of a simple and efficient means for connecting the weed cutting blades to a resilient supporting shank.

Other objects and advantages of the present invention will appear throughout the following specification and claims.

In the drawings:

Figure 1 is a side elevational view of a resilient supporting shank, tool, cutting blade and connecting means;

Figure 2 is a front elevational view;

Figure 3 is a horizontal sectional view taken on line 3—3 of Figure 1;

Figure 4 is a fragmentary perspective view of the associated parts for connecting the weed cutting blade to the shank;

Figure 5 is a side elevational view of a modified form of the invention;

Figure 6 is a perspective view of the form of weed cutting blade shown in Figure 5;

Figure 7 is a side elevational view of a further modified form of the invention;

Figure 8 is a horizontal sectional view taken on line 8—8 of Figure 7;

Figure 9 is a fragmentary rear elevational view of the form shown in Figure 7;

Figure 10 is a perspective view of the shank and blade connecting elements;

Figure 11 is a fragmentary top plan view of a modified form of shank and blade connecting means, the shank being shown in section;

Figure 12 is a view similar to Figure 11 showing a modified form of cutting blade;

Figure 13 is a view similar to Figure 11 showing a further modified design of cutting blade.

By referring to the drawings, it will be seen that A designates a resilient shank which may be of any suitable or desired type such as the bowed type or the coiled type. The shank A carries a suitable tool B, such as a cultivator or plow blade at its lower end and a weed blade supporting element 10 is bolted or otherwise secured to the rear face and lower end of the shank A as shown. This supporting element 10 is provided with a vertically extending and rearwardly projecting web portion 11 which extends at right angles to and centrally of the rear abutment wall 12 of the supporting element 10. A plurality of rows of vertically aligned apertures 13 are formed in the web portion 11, as will be noted in Figure 1. The supporting element 10 is preferably provided at its lower end with a shoulder 14 against which the lower end of the shank A is adapted to abut. The web portion 11 in conjunction with the rear abutment wall 12 will define a T-shaped structure, the web 11 as stated above, extending rearwardly of the abutment wall 12.

In the form shown in Figures 1, 2 and 3, a pair of diverging weed cutting blades 15 are employed having beveled cutting edges 16 at their forward edges, and these blades 15 are provided with hanger elements 17 at their forward ends, which hanger elements 17 comprise vertically extending portions 18 and right-angularly extending horizontal portions 19. The horizontal portions 19 are riveted or otherwise secured to the forward inner ends of the blades 15 and the vertical portions 18 are adjustably secured to the web portion 11 by means of suitable bolts 20 which extend through the vertical portions 18 and into selected apertures 13 of the web portion 11, thereby permitting the blades 15 to be adjusted as to depth without changing the position of the shank A or the tool element B. It should be understood that the blades 15 may be adjusted in a number of selected positions vertically of the web portion 11. The hanger elements 17 fit upon opposite sides of the web portion 11, as shown, and the forward edges 21 thereof are adapted to abut against the rear abutment wall 12 of the supporting element 11, thereby bracing the blades 15 and their hanger elements 17 and resisting any tendency to force the hanger elements and blades out of proper horizontal position and also to relieve strain from the securing bolts 20. It will, therefore be seen that a very simple and efficient structure has been provided for producing an adjustable and well-braced connection between the cutting blades and the supporting element.

In Figures 5 and 6 there is shown a slightly modified type of the invention wherein a supporting element 10ª is illustrated of a structure similar to the element 10, but in the form shown in Figures 5 and 6, the cutting blade 15ª is formed integral with the hanger elements 17ª, which hanger elements 17ª are provided with a forward edge 21ª for abutment against the abutment wall 12ᵃ of the supporting element 10ᵃ. In this form, a single row of apertures 13ᵃ is provided in the shank 11ᵃ for receiving the bolts 20ᵃ carried by the hanger elements 17ᵃ, and which bolts 20ᵃ are adjustably and selectively extended through the apertures 13ᵃ and the apertures 22 formed in the hanger element 17ᵃ.

In the form shown in Figures 7, 8 and 9, a supporting element 25 is carried by the lower end of the resilient shank A', and this supporting element 25 is provided with a vertically extending weed cutting blade supporting portion 26 which is preferably H-shaped in cross-section having a rear flat abutment wall 27 which extends vertically. The H-shaped formation of the blade supporting portion 26 defines vertically extending side channels 28, as shown. An angle hanger member 29 is adjustably secured to the rear abutment face 27 by means of bolts 30 which selectively engage the adjusting apertures 31 of the hanger or supporting element 25. A weed cutting blade 32 is secured to the under face of the horizontal portion 33 of the angle hanger member 29 and this blade 32 is provided with a pair of rearwardly extending radiating cutter arms which are adapted to extend in a horizontal plane as shown. In the form shown in Figures 7, 8 and 9, the nuts 34 which secure the bolts 30 in position are shielded within the channels 28.

The supporting element 25 is provided with a forwardly projecting shank-engaging shoulder 25' which hooks under the lower end of the shank and prevents the element 25 from being forced upwardly, thereby relieving strain from the bolts 9 which secure the element 25 to the shank A' and the tool carried by the shank A', as shown in Figure 7.

In the form shown in Figure 11, I employ a similar structure such as the supporting element 25, but in the type shown in Figure 11, I employ two separate radiating weed cutting blades 32ᵃ which are riveted or otherwise secured to the horizontally extending portion 35 of the hanger member 36.

In the form shown in Figure 12, I employ the supporting element 25 previously described and a hanger element 36ᵃ which is provided with a rearwardly extending horizontal portion 37, to which are pivotally secured the rearwardly extending diverging horizontal weed cutting blades 38, which blades may be adjusted to bring the same toward or away from each other by means of a set screw 39 working in the arc slots 40.

In Figure 13 there is shown a further modified type of the invention wherein the supporting element is utilized, which carries a hanger element 36. This hanger element 36 is provided with a horizontally extending portion 41 and a weed cutting blade 42 is supported thereon, which blade 42 is provided with rearwardly extending and diverging portions similar to that shown and described in Figure 8.

By carefully considering the drawings, and from the foregoing description, it will be seen that I have provided a simple and efficient means for adjustably securing diverging weed cutting blades at or near the rear lower end of a spring or other tool supporting shank, such as may be used upon agricultural implements. I have shown various forms or types of means for adjustably securing these weed cutting blades at or near the rear lower ends of the supporting shanks or shank in a manner whereby the blades may be adjusted vertically according to the cutting depth of the tool carried by the shank. The weed sweep or cutting blades by being attached at or near the tilling or operating end of a resilient steel plow or cultivator shank in a manner whereby these weed cutting sweeps or blades may be vertically adjusted as to the depth of the cutting device, a very efficient means is provided for cutting the weeds and preventing the vegetation from clogging up the shanks as well as providing an additional support for the cutting tool while the device is in operation.

It should be understood that the present device is adaptable for rigid as well as for spring shanks and the spring shanks may be of the type illustrated or of the coil spring type without departing from the spirit of the invention.

Having described the invention, what is claimed as new is:

1. An adjustable weed cutting attachment comprising a supporting portion adapted to be secured to a tool carrying shank, said supporting portion having a vertically extending hanger engaging portion, a flat horizontally extending weed cutting blade extending rearwardly of the shank, said hanger engaging portion having a rearwardly extending vertical web-portion, said web-portion having vertical aligned apertures, said blade having a hanger portion, means carried by the hanger portion for selectively engaging said aligned apertures to hold said blade in a vertically adjusted position relative to a cutting tool adapted to be carried by said shank, and said hanger engaging portion having a vertical abutment wall for engaging the forward edge of said hanger portion for bracing the hanger portion.

2. In combination with a shank, a tool-supporting portion carried by said shank, a substantially flat horizontal weed cutting blade, a hanger portion carried by the blade, securing means for holding the hanger portion upon said tool-supporting portion, an abutment wall carried by the tool-supporting portion and engaging one edge of the hanger portion for resisting upward twisting strain upon said securing means and for securely holding said weed cutting blade in a flat horizontal position.

3. In combination with a shank having a lower end, a forwardly extending digging tool carried by said shank, weed cutting blades extending rearwardly of said shank, a weed cutting blade-supporting portion connected to said weed cutting blades, attaching means for securing said digging tool and said supporting portion to said shank, said supporting portion having an integral angularly projecting lug fitting under the lower end of said shank and constituting a bracing shoulder for resisting upward movement of said supporting portion upon said shank and relieving strain from said attaching means as pressure is exerted upon said weed cutting blades and said supporting portion in the direction of said lug.

WILLIAM T. GRAHAM.